(12) United States Patent
Koga

(10) Patent No.: US 8,422,141 B2
(45) Date of Patent: Apr. 16, 2013

(54) OPTICAL ELEMENT AND OPTICAL APPARATUS

(75) Inventor: Hironobu Koga, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 126 days.

(21) Appl. No.: 13/165,842

(22) Filed: Jun. 22, 2011

(65) Prior Publication Data

US 2011/0317276 A1 Dec. 29, 2011

(30) Foreign Application Priority Data

Jun. 25, 2010 (JP) .................. 2010-144435

(51) Int. Cl.
*G02B 3/00* (2006.01)

(52) U.S. Cl.
USPC .......................................................... 359/654

(58) Field of Classification Search ............... 359/642, 359/652, 654
See application file for complete search history.

(56) References Cited

FOREIGN PATENT DOCUMENTS

| JP | 10-078543 A | 3/1998 |
|---|---|---|
| JP | 3573575 B2 | 7/2004 |

*Primary Examiner* — Jack Dinh
(74) *Attorney, Agent, or Firm* — Rossi, Kimms & McDowell LLP (57) ABSTRACT

In a gradient-index optical element, there is a difference in an abnormal partial dispersion characteristic of a medium between a position on an optical axis of the radial gradient-index optical element and a position on an effective beam diameter.

4 Claims, 10 Drawing Sheets

$\theta_{gd} = -1.687 \times 10^{-7} \nu_d^3 + 5.702 \times 10^{-5} \nu_d^2 - 6.603 \times 10^{-3} \nu_d + 1.462$

OPTICAL ELEMENT AND OPTICAL APPARATUS

BACKGROUND OF THE INVENTION

1. Field of the Invention

The present invention relates to an optical element and an optical apparatus.

2. Description of the Related Art

Japanese Patent No. 3573575 provides a radial gradient-index lens having a refractive index distribution in a radial direction of an optical axis in a medium so as to provide an optical system in which chromatic aberration for light including the g-line is well corrected. When a radial gradient-index lens has an inclination of a distribution that is different for each wavelength, a difference of a partial dispersion ratio between an effective diameter and the optical axis is set to a value within a predetermined range.

Japanese Patent No. 3573575 corrects the single lens's own chromatic aberration by providing a refractive index distribution, but does not provide a structure configured to well correct the chromatic aberration that occurs in an optical system including a plurality of dioptric optical elements.

SUMMARY OF THE INVENTION

The present invention provides an optical element and an optical apparatus having the same, which can well correct a chromatic aberration of an optical system.

A radial gradient-index optical element according to the present invention has a refractive index that varies in a direction perpendicular to an optical axis. The following conditional expressions are satisfied: $|\theta dCgi(re)-(-0.1968\theta gdgi(re)+0.5480)|<0.02$;

$|\Delta\theta gdgi(r)|>0.025$;

$|\Delta\theta gd(re)-\Delta\theta gd(0)|>0.025$;

$|\theta gdgi(re)-\theta gdgi(0.1re)|<0.1$;

$\delta n\lambda(r)=n\lambda(r)-n\lambda(0)$;

$vdgi(r)=\delta nd(r)/\{\delta nF(r)-\delta nC(r)\}$;

$\theta gdgi(r)=\{\delta ng(r)-\delta nd(r)\}/\{\delta nF(r)-\delta nC(r)\}$;

$\theta dCgi(r)=\{\delta nd(r)-\delta nC(r)\}/\{\delta nF(r)-\delta nC(r)\}$;

$\Delta\theta gdgi(r)=\theta gdgi(r)-\{-1.687\times10^{-7}vdgi(r)^3+5.702\times10^{-5}vdgi(r)^2-6.603\times10^{-3}vdgi(r)+1.462\}$; and $\Delta\theta gd(r)=\theta gd(r)-\{-1.687\times10^{-7}vd(r)^3+5.702\times10^{-5}vd(r)^2-6.603\times10^{-3}vd(r)+1.462\}$.

"r" is a distance from the optical axis in the direction perpendicular to the optical axis. "re" is an effective beam diameter. It defines a maximum value of "r" which transmits through the radial gradient-index optical element. "nλ(r)" is a refractive index of a medium of the radial gradient-index optical element at the distance r for one of g-line, F-line, d-line, and C-line. "δnλ(r)" is a refractive index difference of a medium between the optical axis and the distance r. "vd(r)" is an Abbe number of the medium at the distance r. "θgd(r)" is a partial dispersion ratio for the g-line and the d-line of the medium at the distance r. "Δθgd(r)" is a deviation of "θgd(r)" from the normal curve which is made by approximating a relationship between the Abbe number of a general glass and the partial dispersion ratio for the g-line and the d-line of the general glass. "θgdgi(r)" is an equivalent partial dispersion ratio for the g-line and the d-line of the radial gradient-index optical element at the distance r. "θdCgi(r)" is an equivalent partial dispersion ratio for the d-line and the C-line of the radial gradient-index optical element at the distance r. "Δθgdgi(r)" is a deviation of "θgdgi(r)" from the normal curve which is made by approximating a relationship between the Abbe number of a general glass and the partial dispersion ratio for the g-line and the d-line of the general glass. "vdgi(r)" is an equivalent Abbe number of the radial gradient-index optical element at the distance r. The equivalent partial dispersion ratio is a partial dispersion ratio of virtual glass having a chromatic aberration equal to that of the radial gradient-index optical element. The equivalent Abbe number is an Abbe number of the virtual glass.

Further features of the present invention will become apparent from the following description of exemplary embodiments with reference to the attached drawings.

DESCRIPTION OF THE EMBODIMENTS

This embodiment provides an optical system with a radial gradient-index optical element having a refractive index that changes in a direction perpendicular to an optical axis in a medium. In comparison with an axial gradient-index optical element having a refractive index that changes in an optical axis direction in the medium, the medium of the radial gradient-index optical element has a refractive power caused by refractive index distribution, So the radial gradient-index optical element has an advantage of correcting the chromatic aberration by setting a proper refractive index distribution.

In the gradient-index optical element, when a refractive index distribution for each wavelength can be independently controlled, the chromatic aberrations for the d-line, the C-line, the F-line, and the g-line can be simultaneously corrected. However, it is difficult to independently control a refractive index distribution for each wavelength when the gradient-index optical element is actually produced.

Accordingly, this embodiment properly controls a wavelength dispersion characteristic of the gradient-index optical element, and thereby realizes an optical element that has an effect of correcting the chromatic aberration.

An ion exchange method, a sol-gel method, and three-dimensional printing are known as a manufacturing method of a gradient-index optical element. These methods can distribute a refractive index by gradually changing a composition ratio of the gradient-index optical element for each location. In this gradient-index optical element, this embodiment properly sets a refractive index distribution so that the following conditional expressions can be satisfied, and the chromatic aberrations for four wavelengths can be well corrected.

$$|\theta dCgi(re)-(-0.1968\theta gdgi(re)+0.5480)|<0.02 \quad \text{Expression 1}$$

$$|\Delta\theta gdgi(r)|>0.025 \quad \text{Expression 2}$$

$$|\Delta\theta gd(re)-\Delta\theta gd(0)|>0.025 \quad \text{Expression 3}$$

$$|\theta gdgi(re)-\theta gdgi(0.1re)|<0.1 \quad \text{Expression 4}$$

Here, "r" is a distance from the optical axis in the direction perpendicular to the optical axis. "re" is an effective beam diameter. It defines a maximum value of "r" which transmits through the radial gradient-index optical element. θgdgi(r) is an equivalent partial dispersion ratio for the g-line and the d-line of the gradient-index optical element at the distance r. θdCgi(r) is an equivalent partial dispersion ratio for the d-line and the C-line of the gradient-index optical element at the distance r. Δθgdgi(r) is a deviation of θgdgi(r) from the normal curve. Δθgd(r) is a deviation of θgd(r) from a normal curve. Where θgd(r) is paratial dispersion ratio for the g-line and the d-line of the medium at the distance r.

The optical element of this embodiment has a refractive index distribution in the medium, and its refractive index changes according to a position in the medium. Hence, a wavelength dispersion characteristic, such as an Abbe number and a partial dispersion ratio, changes according to the position r.

An equivalent Abbe number and an equivalent partial dispersion ratio of the gradient-index optical system in this embodiment are defined as follows:

In a lens having a homogeneous refractive index in a medium, a beam refracts at an interface between two media and does not refract in the medium. The refractive index of the medium changes according to a wavelength, the beam that refracts in the homogeneous lens is subject to a chromatic aberration.

Refraction is caused by a phase difference of a light flux, and the phase difference is provided by changing the shape of the homogeneous lens. At this time, an Abbe number for the d-line as an index of a wavelength dispersion is expressed by a ratio of the refractive index difference from air that has a refractive index of 1.

On the other hand, in the gradient-index optical element in which a medium has a refractive index distribution, a beam refracts not only at the interface between two media but also in the medium. Therefore, a chromatic aberration occurs in the refraction in the medium due to the wavelength dispersion of the refractive index distribution.

A phase difference caused by the refractive index distribution in the medium is caused by a difference between a refractive index at a reference position in the medium and a refractive index at a position which the beam transmits. Therefore, the wavelength dispersion in the refraction in the medium is a difference between the refractive index at the beam passing position and the refractive index at the reference position.

When the medium is replaced with virtual glass having an equal chromatic aberration of the medium, a wavelength dispersion characteristic of the medium can be equivalently treated as that of virtual glass. In other words, the wavelength dispersion in the refraction in the medium can be replaced with the virtual lens by using equivalent Abbe number and equivalent partial dispersion ratio.

The equivalent Abbe number and equivalent partial dispersion ratio of the gradient-index optical system are defined by using refractive indices ng(r), nF(r), nd(r), and nC(r) of the gradient-index optical element for the g-line, F-line, d-line, and C-line at the distance r. δnλ(r) is a refractive index difference of a medium between two points for one of the g-line, F-line, d-line, and C-line.

$$\delta n\lambda(r)=n\lambda(r)-n\lambda(0)(\lambda=g,F,d,C) \quad \text{Expression 5}$$

$$\nu dgi(r)=\delta nd(r)/\{\delta nF(r)-\delta nC(r)\} \quad \text{Expression 6}$$

$$\theta gdgi(r)=\{\delta ng(r)-\delta nd(r)\}/\{\delta nF(r)-\delta nC(r)\} \quad \text{Expression 7}$$

$$\theta dCgi(r)=\{\delta nd(r)-\delta nC(r)\}/\{\delta nF(r)-\delta nC(r)\} \quad \text{Expression 8}$$

The g-line, F-line, d-line, and C-line have wavelengths of 435.83 nm, 486.13 nm, 587.56 nm, and 656.27 nm, respectively.

At this time, the deviation of θgdgi(r) is defined as follows:

$$\Delta\theta gdgi(r)=\theta gdgi(r)-\{-1.687\times10^{-7}\nu dgi(r)^3+5.702\times10^{-5}\nu dgi(r)^2-6.603\times10^{-3}\nu dgi(r)+1.462\} \quad \text{Expression 9}$$

Figure 10:
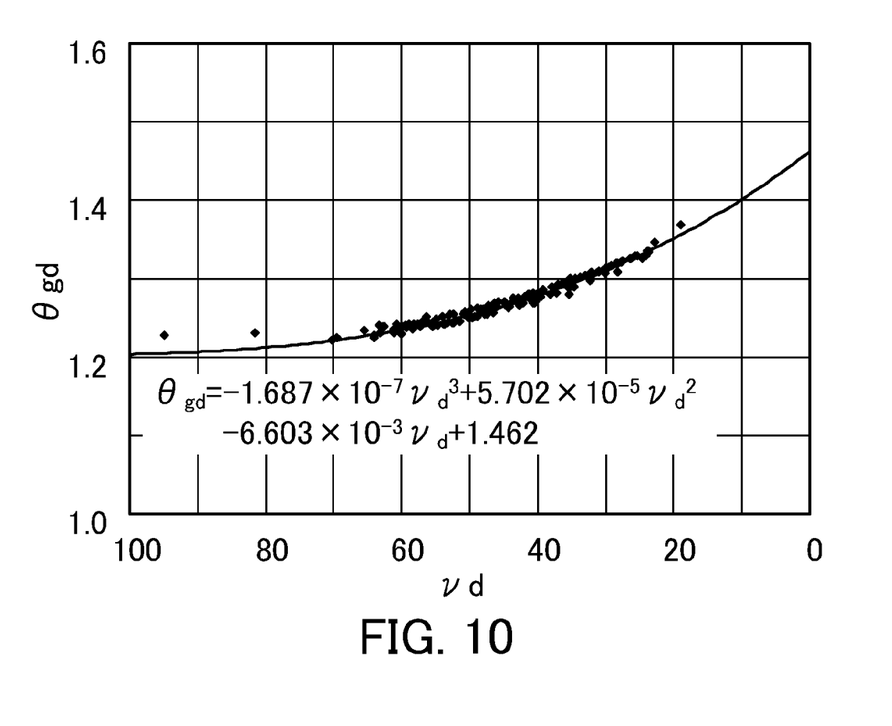
FIG. 10 is a graph of θgd-θdC characteristic of a general glass material.

A { } term in the right side of the above expression expresses the normal curve. This expression made by approximating a relationship between the Abbe number of general glass material and the partial dispersion ratio for the g-line and the d-line as illustrated in FIG. 10, and the above expression represents a difference of a partial dispersion ratio for the g-line and the d-line between the equivalent Abbe number of the gradient-index optical element and the general glass material having the same Abbe number.

The Abbe number of a medium of the gradient-index optical element at a position of a distance r and a partial dispersion ratio for the g-line and the d-line are defined as follows:

$$\nu d(r)=\{nd(r)-1\}/\{nF(r)-nC(r)\} \quad \text{Expression 10}$$

$$\theta gd(r)=\{ng(r)-nd(r)\}/\{nF(r)-nC(r)\} \quad \text{Expression 11}$$

At this time, the deviation of θgd(r) is defined as follows:

$$\Delta\theta gd(r)=\theta gd(r)-\{-1.687\times10^{-7}\theta d(r)^3+5.702\times10^{-5}\nu d(r)^2-6.603\times10^{-3}\nu d(r)+1.462\} \quad \text{Expression 12}$$

Figure 11:
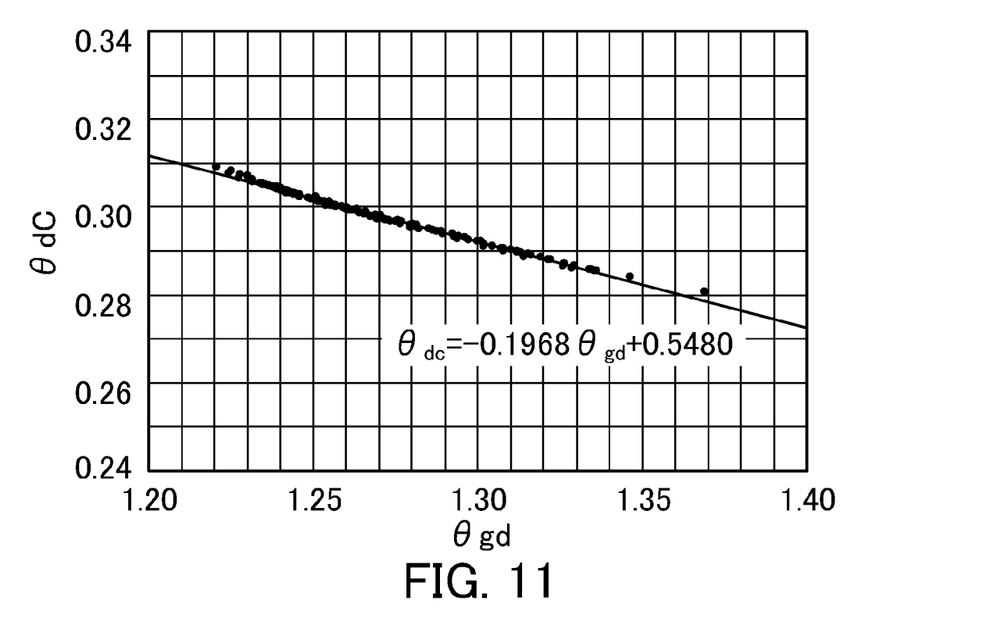
FIG. 11 is a graph of vd-θgd characteristic of a general glass material.

Expression 1 defines a wavelength dispersion characteristic with which the gradient-index optical element can well correct the chromatic aberrations for the d-line, the C-line, the F-line, and the g-line. The { } term in the left side in Expression 1 is an expression made by approximating a relationship between the partial dispersion ratio for the g-line and the d-line of general glass material and the partial dispersion ratio for the d-line and the C-line of general glass material as illustrated in FIG. 11. Thus, the left side represents a difference between an equivalent partial dispersion ratio for the d-line and the C-line of the gradient-index optical element and the partial dispersion ratio for the d-line and the C-line of the general glass material having the same partial dispersion ratio for the g-line and the d-line.

In an attempt to correct a longitudinal chromatic aberrations coefficients Lgd0 and LdC0 for the g-line and the C-line on the basis of the d-line, which occur in the optical system made of general glass material, by using the gradient-index optical element, the longitudinal chromatic aberration coefficients of the overall system Lgd and LdC are expressed as follows:

$$Lgd = Lgd0 + \phi \cdot \theta gdgi \cdot h^2 / vdgi \qquad \text{Expression 13}$$

$$LdC = LdC0 + \phi \cdot \theta dCgi \cdot h^2 / vdgi \qquad \text{Expression 14}$$

The second term in the right side in expression 13 and 14 is a chromatic aberration correcting term using the gradient-index optical element, $\phi$ is a refractive power of the gradient-index optical element, and h is a height of a paraxial on-axis beam. Since the refractive power $\phi$ of the gradient-index optical element, the equivalent Abbe number vdgi, and the height of the paraxial on-axis beam are the same in the above two expressions, it is necessary to optimize values of $\theta$gdgi and $\theta$dCgi of the gradient-index optical element so as to correct both Lgd and LdC. Expression 1 defines a range in which Lgd and LdC can be well corrected.

The lateral chromatic aberration coefficients can be expressed as follows, and both Tgd and TdC can be well corrected by satisfying Expression 1 as in the longitudinal chromatic aberration:

$$Tgd = Tgd0 + \phi \cdot \theta gdgi \cdot h \cdot H / vdgi \qquad \text{Expression 15}$$

$$TdC = TdC0 + \phi \cdot \theta dCgi \cdot h \cdot H / vdgi \qquad \text{Expression 16}$$

Here, Tgd0 and TdC0 are coefficients of the lateral chromatic aberration for the g-line and the C-line on the basis of the d-line which occur in the optical system made of the general glass material, and Tgd and TdC are lateral chromatic aberration coefficients of the overall system for the g-line and the C-line on the basis of the d-line when the gradient-index optical element is used for corrections. H is a height of a paraxial off-axis ray.

Satisfying Expression 1 enables the chromatic aberrations from the g-line to the C-line to be well corrected, and thus the chromatic aberrations can be corrected for the four wavelengths including the d-line, the C-line, the F-line, and the g-line. When a value exceeds the upper limit of Expression 1, it becomes difficult to correct the chromatic aberrations for the four wavelengths including the d-line, the C-line, the F-line, and the g-line, and the chromatic aberration remains. In order to more properly correct the chromatic aberration, the range of Expression 1 may be set as follows:

$$|\theta dCgi(re) - (-0.1968 \theta gdgi(re) + 0.5480)| < 0.01 \qquad \text{Expression 17}$$

The range of Expression 1 may be set as follows:

$$|\theta dCgi(re) - (-0.1968 \theta gdgi(re) + 0.5480)| < 0.005 \qquad \text{Expression 18}$$

Expression 2 defines a deviation of $\theta$gdgi from the normal curve. When the gradient-index optical element that satisfies Expression 2 is used for an optical system, the chromatic aberration for the g-line can be well corrected. In a comparison using the same refractive power, as a value of the left side of Expression 2 is higher, an effect of correcting the chromatic aberration for the g-line can be higher. As a value of the left side of Expression 2 is higher, the chromatic aberration can be corrected with a smaller refractive power. When the chromatic aberration can be corrected with a smaller refractive power, the refractive index difference necessary to produce the gradient-index optical element can be smaller or thickness necessary to produce the gradient-index optical element can be thinner and thus the manufacture can be easier, the cost can be further reduced, and the optical system can be smaller. Expression 2 may be set as follows:

$$|\Delta \theta gdgi(re)| > 0.500 \qquad \text{Expression 19}$$

Expression 2 may also be set as follows:

$$|\Delta \theta gdgi(re)| > 1.000 \qquad \text{Expression 20}$$

Expression 3 defines a difference of an abnormal partial dispersion characteristic of a medium between the optical axis and the effective beam diameter of the gradient-index optical element. The equivalent Abbe number and equivalent partial dispersion ratio of the gradient-index optical element are provided by a refractive index difference of the medium between the optical axis and the effective beam diameter.

Figure 12A:
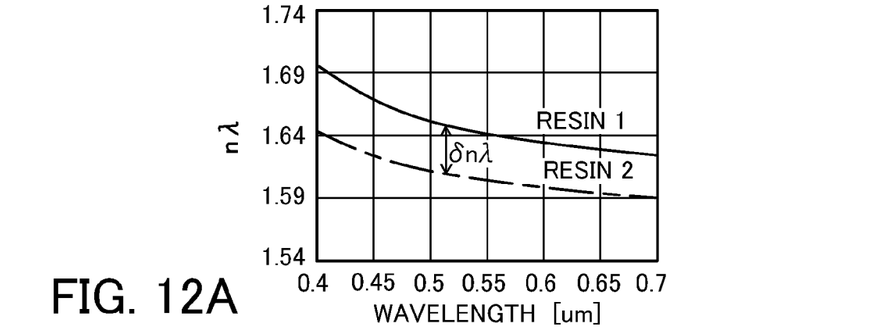
FIGS. 12A and 12B are graphs of a wavelength dispersion characteristic of a gradient-index optical element.
Figure 12B:
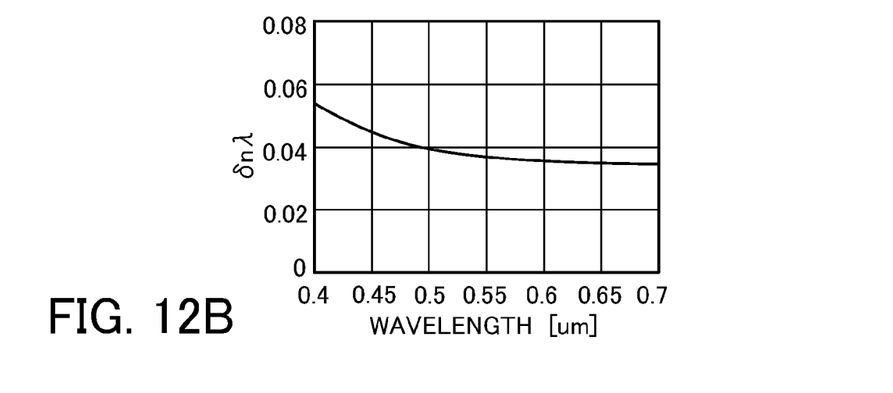

FIG. 12A is a view that illustrates refractive index wavelength dispersion characteristics among the medium, resin 1 (having a large abnormal partial dispersion characteristic), and resin 2 (having a small abnormal partial dispersion characteristic) on the optical axis and effective beam diameter of the first embodiment. The wavelength dispersion characteristic of the gradient-index optical element is provided by a refractive index difference $\delta n\lambda$ between these two media (FIG. 12B).

In order to strengthen $\Delta\theta$gdgi(r), a refractive index difference on the short wavelength side is made larger or smaller. At this time, it is difficult to adjust the refractive index difference on the short wavelength side when there is no difference in the abnormal partial dispersion characteristic of the medium between the optical axis and effective beam diameter. Hence, in order for the gradient-index optical element to possess the abnormal partial dispersion characteristic, there is needed a difference of the abnormal partial dispersion characteristic of the medium between the optical axis and the effective beam diameter.

Satisfying Expression 3 enhances the abnormal dispersion characteristic of the equivalent partial dispersion ratio of the gradient-index optical element, and can provide a gradient-index optical element having a wavelength dispersion characteristic that can effectively correct the chromatic aberrations for four wavelengths.

A medium having an abnormal partial dispersion characteristic is, for example, ultraviolet ("UV") curable resin, a particle dispersed material which inorganic oxide particles such as TiO2, ITO are dispersed in optical material such as resin, glass with proper volume ratio. However, as long as the material has the abnormal partial dispersion characteristic or satisfies the conditional expression of $|\Delta\theta gd|>0.025$, the present invention is not limited to the above materials.

The refractive index $n(\lambda)$ of the particle dispersed material at the wavelength $\lambda$ can be calculated by the following expression derived from the Drude formula using a refractive index $no(\lambda)$ of the optical material, a refractive index $nm(\lambda)$ of the particle, a volume ratio V of the particle to the optical material.

$$n(\lambda) = [1 + V\{nm(\lambda)^2 - 1\} + (1-V)\{no(\lambda)^2 - 1\}]^{1/2} \qquad \text{Expression 21}$$

Expression 4 defines a refractive index distribution of the optical element according to this embodiment. When an equivalent partial dispersion ratio of the gradient-index optical element between the optical axis and the effective beam diameter is set so that Expression 4 can be satisfied, a gradient-index optical element manufactured by changing a composition ratio of the material can be realized. Therefore, the gradient-index optical element according to this embodiment can be obtained by a sol-gel method or another method and by properly selecting a medium so that Expressions 1 to 4 can be satisfied.

The following conditional expressions may be satisfied so as to more appropriately correct the chromatic aberration in addition to the above conditional expressions:

$$|vdgi(re)| < 30 \qquad \text{Expression 22}$$

Here, νdgi is an equivalent Abbe number of the gradient-index optical element. Satisfying Expression 22 enables the chromatic aberration to be independently corrected while a variety of aberrations, such as spherical aberration and coma, are not affected. In order to enhance the chromatic aberration correcting effect, a range of Expression 22 may be set as follows:

$$|\nu dgi(re)|<20 \quad \text{Expression 23}$$

A range of Expression 22 may be set as follows:

$$|\nu dgi(re)|<10 \quad \text{Expression 24}$$

In the radial gradient-index optical element, as δnλ(re) which is difference between a reference refractive index nλ(0) on the optical axis and a refractive index nλ(re) on the effective beam diameter becomes larger, a refractive power by the refractive index distribution becomes larger. Hence, in the visible wavelength range from 400 nm to about 700 nm, δnλ(re) may be set to 0.01 or larger.

In addition, since the light is refracted in the optical element according to this embodiment due to the refractive index distribution in the medium, the light incidence surface and the light exit surface may have flat (plate) shapes. The flat surface shape mitigates the required surface precision. When the gradient-index optical element is made of resin, the influence of the performance deterioration caused by the surface shape change can be reduced as the temperature or humidity varies. The shape of the gradient-index optical element is not limited to the plate shape and may be a lens shape.

Next follows a detailed description of each embodiment:

First Embodiment

An optical system according to the first embodiment is a telephoto lens having a focal length of 294 mm and a telephoto ratio of 0.78. The optical system according to the first embodiment illustrated in FIG. 1 includes a first lens unit L1 of a positive refractive power which is fixed during focusing, a second lens unit L2 which has a negative refractive power and is configured to move in the optical axis direction during focusing, and a third lens unit L3 of a negative refractive power which is fixed during focusing.

Figure 1:
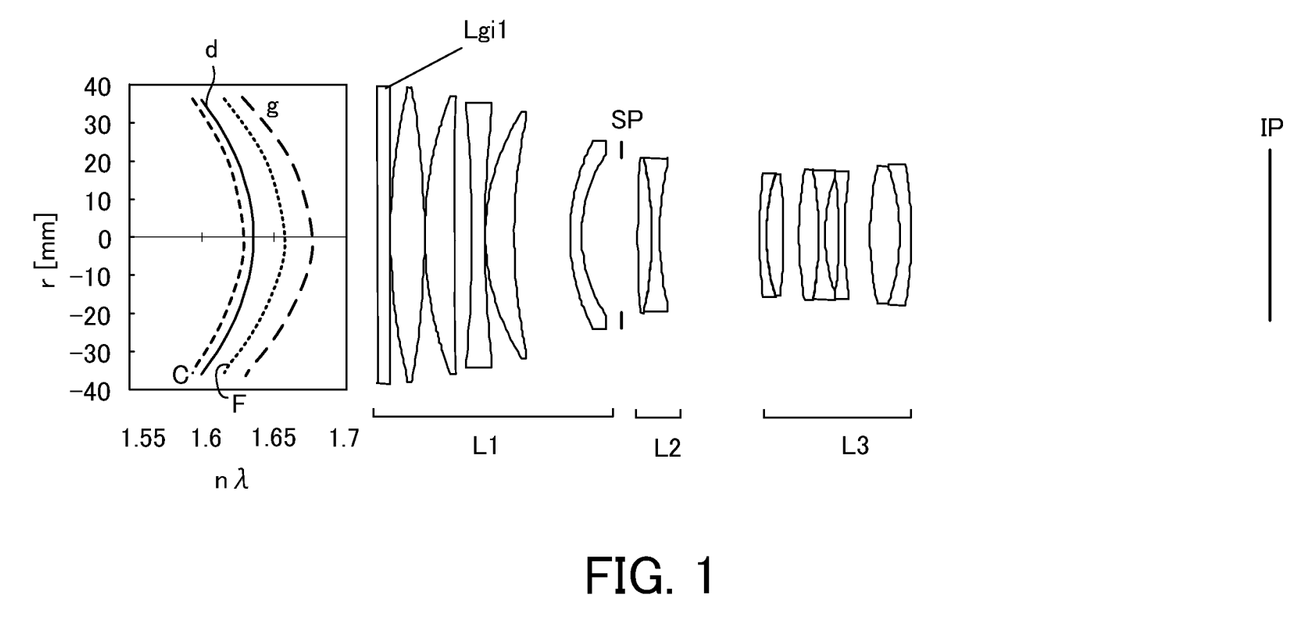
FIG. 1 is a sectional view of an optical system according to Numerical Example 1.

The first embodiment uses a radial gradient-index optical element Lgi1 that includes resins 1 and 2 characteristics described in Table 1. The resin 1 is UV curable resin, and resin 2 is fluorine-based resin. This gradient-index optical element has a volume ratio of 100% of resin 1 on the optical axis and a volume ratio of 100% of resin 2 at r=36 mm. The refractive index of the resin 1 is higher than that of the resin 2, and the refractive index reduces from the optical axis to the effective beam diameter. Thus, the refractive power of the gradient-index optical element is positive.

Making a difference between Δθgd(0) of the medium on the optical axis and Δθgd(re) of the medium at the effective beam diameter enhances Δθgdgi(r) (Δθgdgi(r)>0). The gradient-index optical element that can properly correct the chromatic aberrations for four wavelengths is realized by using a combination of the resins 1 and 2 for the medium which satisfies the above conditions and Expression 1. In the first embodiment, both surfaces of the gradient-index optical element are flat, ray is not bent at surface, but ray is bent by an action of a refractive index distribution.

Figure 2:
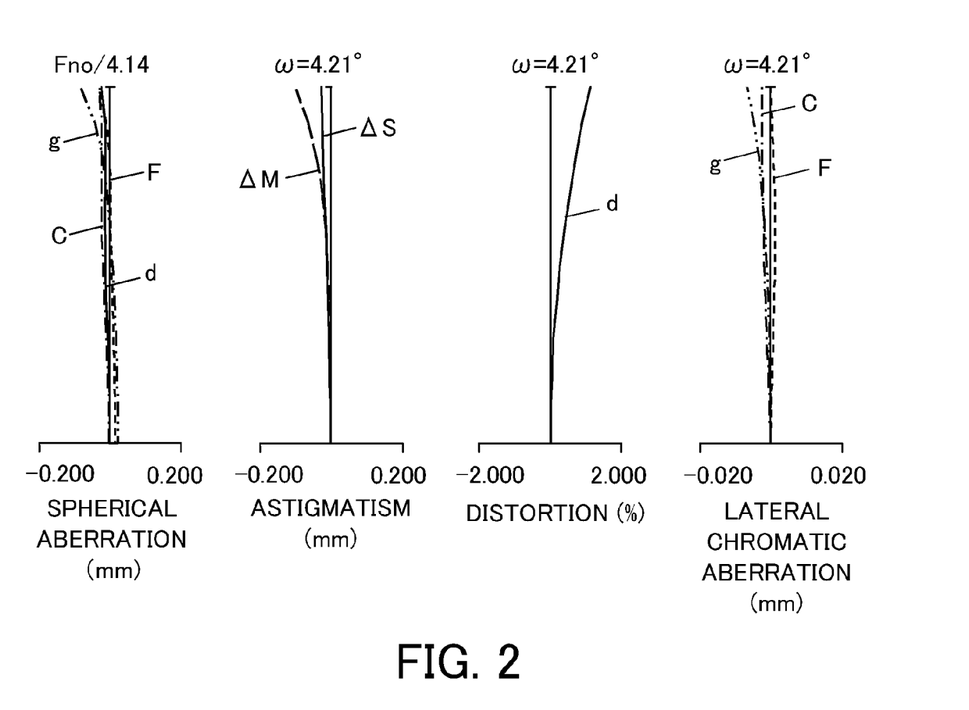
FIG. 2 is an aberrational diagram at an infinity in-focus state of the optical system according to Numerical Example 1.

FIG. 2 is an aberrational diagram in the infinity in-focus state according to Numerical Example 1. Since the radial gradient-index optical element is used for the first lens unit in which a passing position of a paraxial on-axis ray is high, the lateral chromatic aberration is particularly well corrected. Satisfying Expressions 1 to 4 can well correct the chromatic aberrations for four wavelengths including the d-line, the C-line, the F-line, and the g-line.

Second Embodiment

Figure 3:
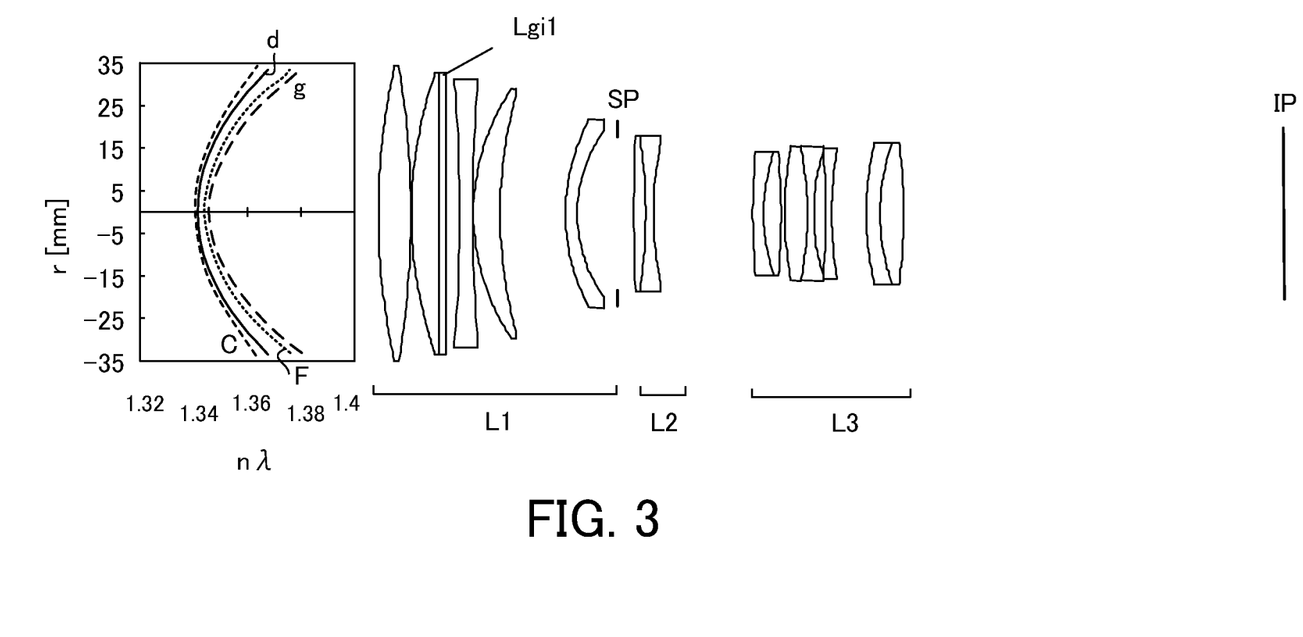
FIG. 3 is a sectional view of an optical system according to Numerical Example 2.

An optical system of a second embodiment is a telephoto lens that has the same specification and the same unit structure as that of the first embodiment, and FIG. 3 is a sectional view of the optical system.

The second embodiment uses a radial gradient-index optical element Lgi1 that includes ITO particles dispersed fluorine resin 3 having characteristics described in Table 1. This gradient-index optical element has a volume ratio of 0% of the ITO particles to the resin 3 on the optical axis and its volume ratio of 5% at r=36 mm. The refractive index increases from the optical axis to the effective beam diameter, and the refractive power of the refractive index distribution is negative. Making a difference between Δθgd(0) of the medium on the optical axis and the Δθgd(re) of the medium on the effective beam diameter enhances Δθgdgi(r)(Δθgdgi(r)<0).

The gradient-index optical element that can correct the chromatic aberrations for four wavelengths is realized by using the particle dispersed material in which the ITO particles are dispersed in the resin 3 which satisfies the above conditions and Expression 1. In the second embodiment, the gradient-index optical element has a lens shape, and a ray is bent not only by a refractive power caused by the refractive index distribution but also by a refractive power caused by the surface.

Figure 4:
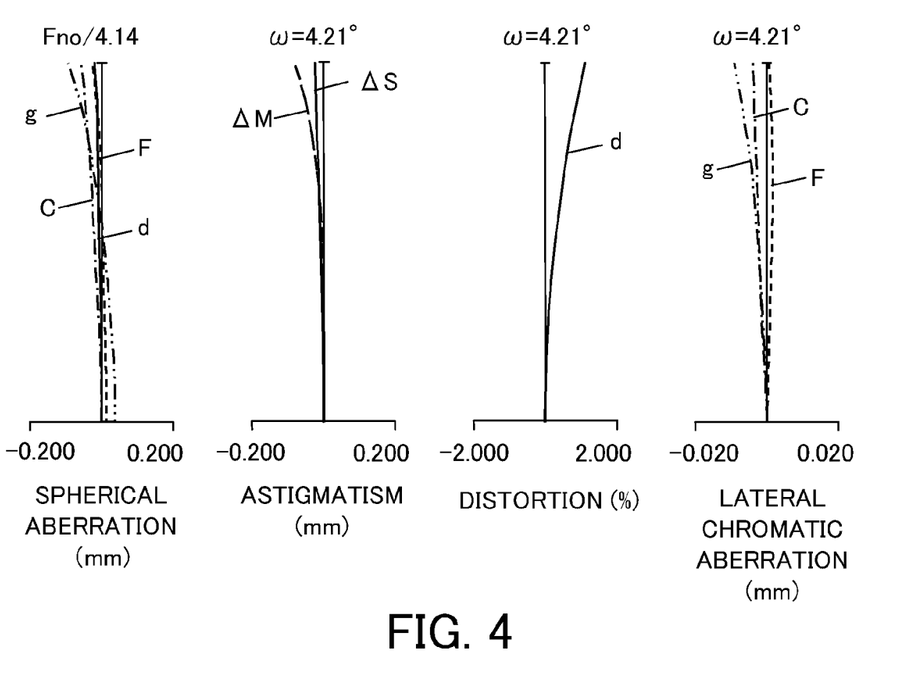
FIG. 4 is an aberrational diagram at an infinity in-focus state of the optical system according to Numerical Example 2.

FIG. 4 is an aberrational diagram in the infinity in-focus state according to Numerical Example 2. Since the radial gradient-index optical element is used for the first lens unit in which a passing position of a paraxial on-axis ray is high, the lateral chromatic aberration is particularly well corrected. Satisfying Expressions 1 to 4 can well correct the chromatic aberrations for four wavelengths including the d-line, the C-line, the F-line, and the g-line.

Third Embodiment

Figure 5:
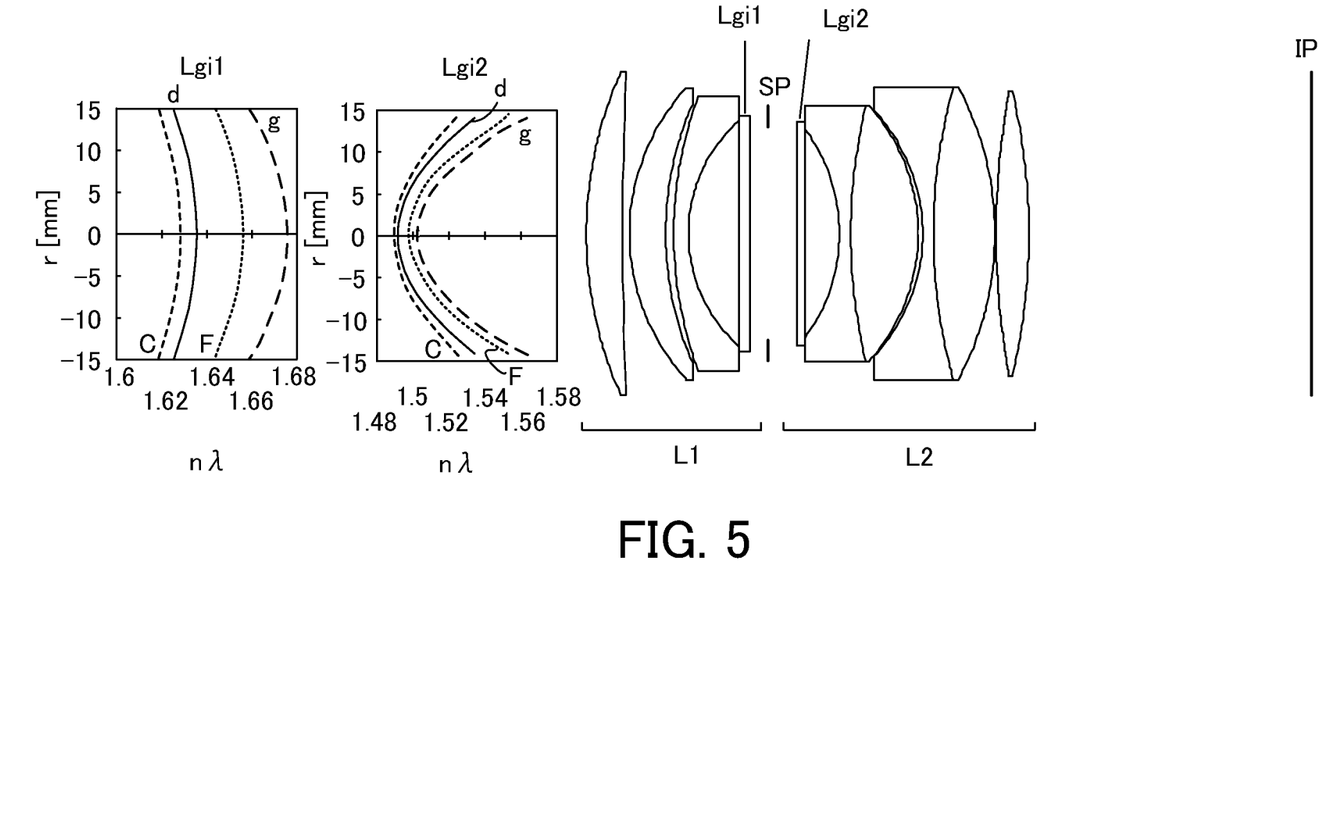
FIG. 5 is a sectional view of an optical system according to Numerical Example 3.

An optical system of a third embodiment is a normal lens that has a focal length of 51.5 mm, and FIG. 5 is a sectional view of the optical system.

The third embodiment uses two gradient-index optical elements. A gradient-index optical element Lgi1 is placed at the first lens unit L1 and another gradient-index optical element Lgi2 is placed at f the second lens unit L2. Lgi1 has a volume ratio of 100% of the resin 1 on the optical axis and a volume ratio of 100% of resin 4 at r=15 mm. The resin 4 is fluorine-based resin that has a characteristic in Table 1. The refractive index of the resin 1 is larger than that of the resin 4, and reduces from the optical axis to the effective beam diameter. The refractive power of the gradient-index optical element is positive.

Lgi2 is a radial gradient-index optical element that includes the ITO particles dispersed in acrylic resin 5, and has a volume ratio of 0% of the ITO particles to the acrylic resin 5 on the optical axis and a volume ratio of 5% at r=15 mm. The refractive index increases from the optical axis to the effective beam diameter, and the refractive power of the gradient-index optical element is negative.

The gradient-index optical element Lgi1 includes the resin 1 (Δθgd>0) having a high abnormal partial dispersion characteristic and the resin 4 having a low abnormal partial dispersion characteristic and enhances Δθgdgi(r)(Δθgdgi(r)>0).

A combination of the resins 1 and 4 satisfies Expression 1 and provides a wavelength dispersion characteristic that can effectively correct the chromatic aberrations for four wavelengths.

The gradient-index optical element Lgi2 uses a material ($\Delta\theta gd<0$) having a high abnormal partial dispersion characteristic for the medium at the effective beam diameter and a material having a low abnormal partial dispersion characteristic for the medium on the optical axis. Thereby, $\Delta\theta gdgi(r)$ is enhanced ($\Delta\theta gdgi(r)<0$). In addition, the gradient-index optical element Lgi2 satisfies Expression 1, and is useful to correct the chromatic aberrations for four wavelengths.

Figure 6:
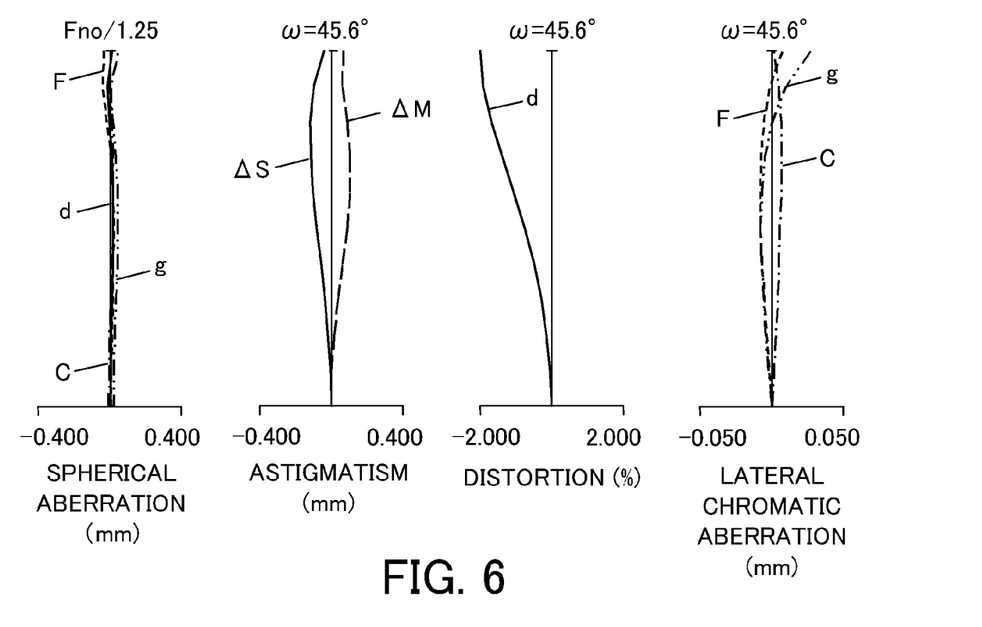
FIG. 6 is an aberrational diagram at an infinity in-focus state of the optical system according to Numerical Example 3.

FIG. 6 is an aberrational diagram in the infinity in-focus state according to Numerical Example 3. The radial gradient-index optical elements Lgi1 and Lgi2 are arranged near the stop, and thus can well correct the chromatic aberrations.

Fourth Embodiment

An optical system according to a fourth embodiment is a wide angle lens having a focal length of 24.7 mm. The optical system according to the fourth embodiment illustrated in FIG. 7 includes a first lens unit L1 having a negative refractive power which is fixed during focusing, a second lens unit L2 which has a negative refractive power and is configured to move in the optical axis direction during focusing, and a third lens unit L3 which has a positive refractive power and is configured to move in the optical axis direction during focusing.

Figure 7:
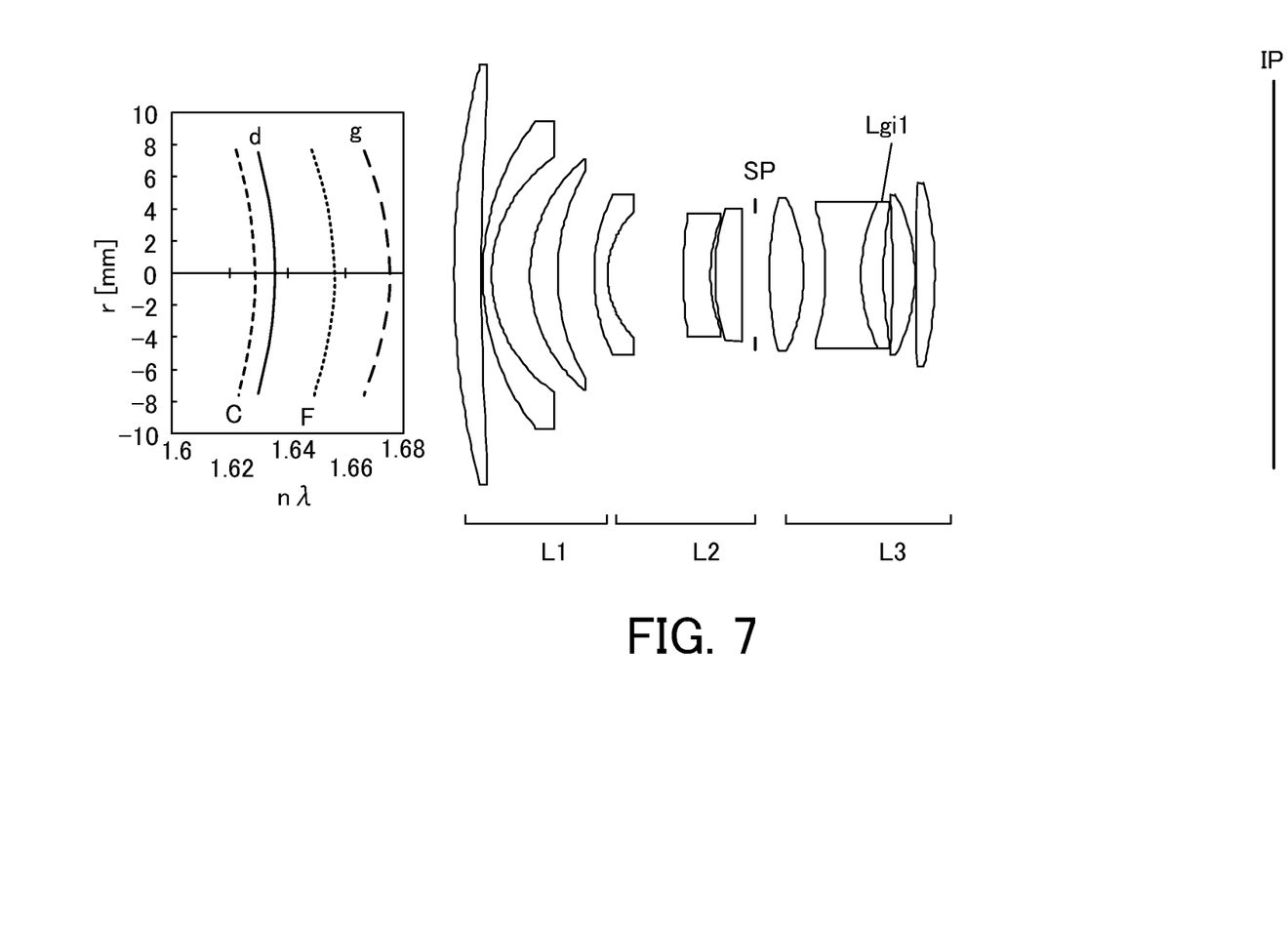
FIG. 7 is a sectional view of an optical system according to Numerical Example 4.

Similar to the first embodiment, the fourth embodiment uses a radial gradient-index optical element Lgi1 that includes the resins 1 and 2 by changing a composition ratio between them. The gradient-index optical element has a volume ratio of 100% of the resin 1 on the optical axis and a volume ratio of 100% of the resin 2 at r=10 mm. The refractive power of the gradient-index optical element is positive. Satisfying Expressions 1 to 4 can provide an optical element that can well correct the chromatic aberrations for four wavelengths.

Figure 8:
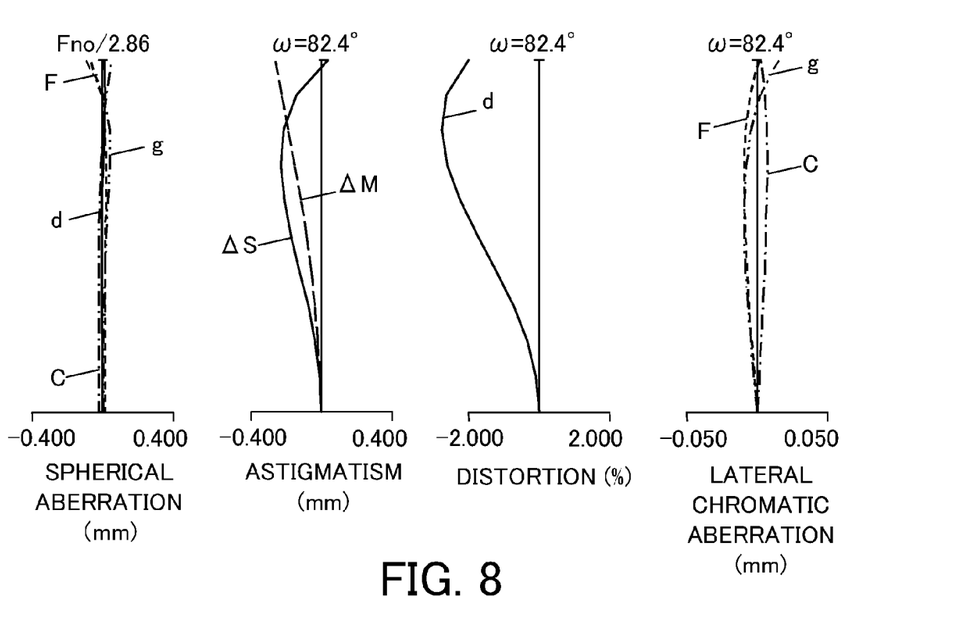
FIG. 8 is an aberrational diagram at an infinity in-focus state of the optical system according to Numerical Example 4.

FIG. 8 is an aberrational diagram in the infinity in-focus state according to Numerical Example 4. Since the radial gradient-index optical element is arranged after the stop, the optical element is useful to correct the chromatic aberrations for four wavelengths.

Numerical data of Numerical Examples 1 to 4 will be illustrated below: In each numerical example, "j" denotes a surface number counted from the object side. "Aj" denotes an effective beam diameter of a j-th surface. "Rj" denotes a radius of curvature of the j-th surface number. "Dj" is a distance on the optical axis between the j-th surface and the (j+1)-th surface. "Nj" is a refractive index of the j-th optical material for the d-line. "vj" is an Abbe number of the j-th optical material for the d-line. "f" denotes a focal length of the optical system. "Fno" denotes an F number. "ω" denotes half an angle of view.

The refractive index distribution $n\lambda(r)$ of the radial gradient-index optical element according to this embodiment for the wavelength λ is expressed by the following expression where r is a height from the optical axis in a direction perpendicular to the optical axis, and $Ni\lambda$ (i=0, 1, 2, 3, . . . ) is a coefficient of a $r^{2i}$ term.

$$n_\lambda(r) = N_{0\lambda} + N_{1\lambda}r^2 + N_{2\lambda}r^4 + N_{3\lambda}r^6 + \ldots \quad (\lambda=d,g,C,F) \qquad \text{Expression 25}$$

The aspheric shape is expressed by the following expression where X is a displacement amount from a surface vertex in the optical axis direction, r is a height from the optical axis in the direction perpendicular to the optical axis, R is a paraxial radius of curvature, k is a cone constant, and B, C, D, E, . . . are aspheric shapes for each order.

$$X(h) = \frac{(1/R)h^2}{1 + \sqrt{1 - (1+k)(h/R)^2}} + Br^4 + Cr^6 + Dr^8 + Er^{10} + \ldots \qquad \text{Expression 26}$$

"E±YY" in each coefficient means "$\times 10^{\pm YY}$." Table 1 illustrates a material characteristic of each medium used for each embodiment, and Table 2 illustrates values of the above conditional expressions in each numerical example.

| (Numerical Example 1) | | | | | |
|---|---|---|---|---|---|
| f = 294.0 Fno = 4.14 2ω = 8.42° | | | | | |
| j | Aj | Rj | Dj | Nj | vj |
| 1 | 35.92 | ∞ | 3.17 | 1.63555 | 22.7 Lgi1 |
| 2 | 35.77 | ∞ | 0.15 | | |
| 3 | 35.44 | 158.9814 | 8.68 | 1.48749 | 70.3 |
| 4 | 35.30 | −218.0367 | 0.15 | | |
| 5 | 33.48 | 97.5241 | 7.58 | 1.48749 | 70.3 |
| 6 | 32.97 | 1550.9767 | 4.48 | | |
| 7 | 31.89 | −389.0321 | 3.40 | 1.84666 | 23.9 |
| 8 | 30.88 | 268.7460 | 0.15 | | |
| 9 | 29.61 | 56.7405 | 7.40 | 1.51823 | 58.9 |
| 10 | 28.96 | 144.0084 | 14.38 | | |
| 11 | 22.44 | 50.3724 | 3.00 | 1.80400 | 46.6 |
| 12 | 20.62 | 36.2760 | 10.43 | | |
| 13 | 19.60 | ∞ | 4.00 | | (STOP) |
| 14 | 18.41 | 304.2771 | 3.69 | 1.80518 | 25.4 |
| 15 | 18.20 | −91.4397 | 2.00 | 1.83400 | 37.2 |
| 16 | 17.28 | 81.7076 | 25.82 | | |
| 17 | 14.42 | 193.4370 | 1.60 | 1.84666 | 23.9 |
| 18 | 14.12 | 50.0497 | 4.39 | 1.65844 | 50.9 |
| 19 | 13.99 | −175.9132 | 4.03 | | |
| 20 | 15.37 | 91.0119 | 5.12 | 1.69895 | 30.1 |
| 21 | 15.16 | −93.5494 | 1.60 | 1.62299 | 58.2 |
| 22 | 14.68 | 43.4326 | 3.59 | | |
| 23 | 14.70 | −129.1097 | 1.50 | 1.77250 | 49.6 |
| 24 | 15.07 | 118.8255 | 6.55 | | |
| 25 | 15.91 | 81.3444 | 7.58 | 1.67270 | 32.1 |
| 26 | 16.18 | −53.4234 | 3.00 | 1.84666 | 23.9 |
| 27 | 16.60 | −111.5246 | | | |

| Lgi1 Refractive index distribution | | | | |
|---|---|---|---|---|
| | g | F | d | C |
| N1λ | 1.67532 | 1.65604 | 1.63555 | 1.62807 |
| N2λ | −3.5570E−05 | −3.1145E−05 | −2.7466E−05 | −2.6612E−05 |
| N3λ | −3.7760E−10 | −2.9288E−10 | −2.3062E−10 | −2.1749E−10 |
| N4λ | −8.0172E−15 | −5.5082E−15 | −3.8728E−15 | −3.5550E−15 |

| (Numerical Example 2) | | | | | |
|---|---|---|---|---|---|
| f = 294.0 Fno = 4.14 2ω = 8.42° | | | | | |
| j | Aj | Rj | Dj | Nj | vj |
| 1 | 35.47 | 173.0860 | 8.23 | 1.48749 | 70.3 |
| 2 | 35.35 | −228.4402 | 0.15 | | |
| 3 | 33.82 | 107.1016 | 7.00 | 1.48749 | 70.3 |
| 4 | 33.45 | 9657.6667 | 1.62 | — | — Lgi1 |
| 5 | 33.03 | 4159.2614 | 3.55 | | |
| 6 | 32.25 | −438.0582 | 3.40 | 1.83400 | 37.2 |
| 7 | 31.42 | 445.6428 | 0.15 | | |
| 8 | 29.83 | 56.2593 | 6.78 | 1.51633 | 64.2 |

(Numerical Example 2)

| | | | | | |
|---|---|---|---|---|---|
| 9 | 29.15 | 114.1652 | 16.56 | | |
| 10 | 22.25 | 50.2049 | 3.00 | 1.71736 | 29.5 |
| 11 | 20.47 | 36.1110 | 10.36 | | |
| 12 | 19.45 | ∞ | 4.00 | | (STOP) |
| 13 | 18.24 | 408.7723 | 2.92 | 1.80518 | 25.4 |
| 14 | 18.03 | −134.7779 | 2.00 | 1.83481 | 42.7 |
| 15 | 17.23 | 81.7076 | 25.23 | | |
| 16 | 14.54 | 217.5744 | 2.80 | 1.84666 | 23.9 |
| 17 | 14.14 | 50.3186 | 4.30 | 1.67790 | 55.4 |
| 18 | 14.01 | −209.8404 | 1.00 | | |
| 19 | 15.68 | 98.2868 | 5.73 | 1.67270 | 32.1 |
| 20 | 15.47 | −81.1563 | 1.60 | 1.60738 | 56.8 |
| 21 | 15.03 | 51.1147 | 3.08 | | |
| 22 | 15.04 | −177.5952 | 1.50 | 1.77250 | 49.6 |
| 23 | 15.25 | 109.1715 | 8.74 | | |
| 24 | 16.29 | 76.5480 | 3.50 | 1.83481 | 42.7 |
| 25 | 16.42 | 52.6914 | 6.00 | 1.62588 | 35.7 |
| 26 | 16.60 | −147.5305 | | | |

Lgi1 Refractive Index Distribution

| | g | F | d | C |
|---|---|---|---|---|
| N1λ | 1.34587 | 1.34394 | 1.34139 | 1.34030 |
| N2λ | 3.0937E−05 | 2.8581E−05 | 2.3722E−05 | 2.0670E−05 |
| N3λ | −3.5556E−10 | −3.0392E−10 | −2.0976E−10 | −1.5939E−10 |
| N4λ | 8.1731E−15 | 6.4634E−15 | 3.7094E−15 | 2.4581E−15 |

(Numerical Example 3)

f = 51.5 Fno = 1.25 2ω = 45.6°

| j | Aj | Rj | Dj | Nj | νj | |
|---|---|---|---|---|---|---|
| 1 | 20.68 | 53.3539 | 5.00 | 1.69100 | 54.8 | |
| 2 | 20.47 | 496.2853 | 0.95 | | | |
| 3 | 18.59 | 29.1258 | 5.00 | 1.80610 | 33.3 | |
| 4 | 17.62 | 44.0503 | 1.13 | | | |
| 5 | 17.44 | 54.0883 | 2.00 | 1.69895 | 30.1 | |
| 6 | 14.93 | 20.4729 | 6.96 | | | |
| 7 | 14.87 | ∞ | 1.50 | — | — | Lgi1 |
| 8 | 14.77 | ∞ | 2.50 | | | |
| 9 | 14.50 | ∞ | 3.94 | | | (STOP) |
| 10 | 14.06 | ∞ | 1.15 | — | — | Lgi2 |
| 11 | 13.98 | ∞ | 4.75 | | | |
| 12 | 13.96 | −23.6879 | 1.60 | 1.74950 | 35.3 | |
| 13 | 15.86 | 76.14523 | 9.25 | 1.80400 | 46.6 | |
| 14 | 16.27 | −25.793 | 0.61 | | | |
| 15 | 16.22 | −24.3379 | 1.50 | 1.66680 | 33.1 | |
| 16 | 18.36 | 73.7637 | 8.50 | 1.83481 | 42.7 | |
| 17 | 18.66 | −41.9315 | 0.15 | | | |
| 18 | 18.03 | 97.87891 | 4.50 | 1.77250 | 49.6 | (aspheric) |
| 19 | 18.10 | −84.1021 | | | | |

| | g | F | d | C |
|---|---|---|---|---|

Lgi1 Refractive Index Distribution

| | g | F | d | C |
|---|---|---|---|---|
| N1λ | 1.67532 | 1.65604 | 1.63555 | 1.62807 |
| N2λ | −7.4296E−05 | −5.7634E−05 | −4.5708E−05 | −4.3522E−05 |
| N3λ | −1.6474E−09 | −1.0029E−09 | −6.3869E−10 | −5.8171E−10 |
| N4λ | −7.3059E−14 | −3.4903E−14 | −1.7849E−14 | −1.5550E−14 |

(Numerical Example 3)

Lgi2 Refractive Index Distribution

| | | | | |
|---|---|---|---|---|
| N1λ | 1.50279 | 1.49774 | 1.49171 | 1.48917 |
| N2λ | 3.0369E−04 | 2.7672E−04 | 2.1876E−04 | 1.8175E−04 |
| N3λ | −3.0686E−08 | −2.5564E−08 | −1.6040E−08 | −1.1091E−08 |
| N4λ | 6.2013E−12 | 4.7232E−12 | 2.3522E−12 | 1.3537E−12 |

Eighteenth Surface: Aspheric Surface

| | |
|---|---|
| B | −1.73067E−06 |
| C | 5.94620E−10 |
| D | −9.23889E−13 |

(Numerical Example 4)

f = 24.7 Fno = 2.86 2ω = 82.4°

| j | Aj | Rj | Dj | Nj | νj | |
|---|---|---|---|---|---|---|
| 1 | 22.00 | 95.4083 | 3.10 | 1.61800 | 63.3 | |
| 2 | 21.30 | 337.2955 | 0.15 | | | |
| 3 | 15.95 | 27.7562 | 1.00 | 1.83481 | 42.7 | |
| 4 | 13.13 | 15.7254 | 4.30 | | | |
| 5 | 11.82 | 16.6210 | 3.08 | 1.80809 | 22.8 | |
| 6 | 11.05 | 22.8610 | 4.09 | | | |
| 7 | 8.10 | 19.7595 | 1.50 | 1.83481 | 42.7 | |
| 8 | 6.50 | 9.7228 | 8.56 | | | |
| 9 | 5.88 | 50.1341 | 3.00 | 1.75520 | 27.5 | |
| 10 | 6.15 | 16.8837 | 0.52 | | | |
| 11 | 6.26 | 23.6567 | 2.97 | 1.64769 | 33.8 | |
| 12 | 6.60 | ∞ | 1.50 | | | |
| 13 | 7.00 | ∞ | 1.61 | | | (STOP) |
| 14 | 7.64 | 37.1183 | 3.88 | 1.80610 | 40.9 | |
| 15 | 7.71 | −19.5298 | 2.46 | | | |
| 16 | 6.81 | −24.9442 | 4.00 | 1.84666 | 23.8 | |
| 17 | 6.72 | 19.1385 | 2.52 | — | — | Lgi1 |
| 18 | 7.36 | 46.0668 | 1.03 | | | |
| 19 | 7.54 | −119.2637 | 2.48 | 1.60311 | 60.7 | |
| 20 | 8.03 | −19.6375 | 0.15 | | | |
| 21 | 9.03 | 570.1252 | 2.09 | 1.72000 | 50.3 | |
| 22 | 9.30 | −42.9191 | | | | |

Lgi1 Refractive Index Distribution

| | g | F | d | C |
|---|---|---|---|---|
| N1λ | 1.67532 | 1.65604 | 1.63555 | 1.62807 |
| N2λ | −1.6717E−04 | −1.2968E−04 | −1.0284E−04 | −9.7923E−05 |
| N3λ | −8.3400E−09 | −5.0771E−09 | −3.2334E−09 | −2.9449E−09 |
| N4λ | −8.3218E−13 | −3.9756E−13 | −2.0331E−13 | −1.7713E−13 |

TABLE 1

|  | Resin 1 | Resin 2 | Resin 3 | Resin 4 | Resin 5 | ITO |
|---|---|---|---|---|---|---|
| nd | 1.63555 | 1.59956 | 1.34139 | 1.62524 | 1.49171 | 1.85712 |
| ng | 1.67532 | 1.62857 | 1.34587 | 1.65852 | 1.50279 | 1.99244 |
| nC | 1.62807 | 1.59321 | 1.34030 | 1.61825 | 1.48917 | 1.79794 |
| nF | 1.65604 | 1.61517 | 1.34394 | 1.64302 | 1.49774 | 1.94870 |
| νd | 22.73 | 27.30 | 93.79 | 25.24 | 57.39 | 5.69 |
| θgd | 1.4220 | 1.3210 | 1.2308 | 1.3438 | 1.2931 | 0.8976 |
| θdC | 0.2675 | 0.2892 | 0.2995 | 0.2820 | 0.2962 | 0.3925 |
| Δθgd | 0.083 | 0.000 | 0.026 | 0.015 | 0.054 | −0.529 |

TABLE 2

| Cond. | First Embod. | Second Embod. | Third Embodiment | | Fourth Embod. |
|---|---|---|---|---|---|
| Exp. | Lgi1 | Lgi1 | Lgi1 | Lgi2 | Lgi2 |
| 1 | 0.0074 | 0.0176 | 0.0060 | 0.0183 | 0.0058 |
| 2 | 0.3667 | 0.5324 | 0.5870 | 0.5558 | 0.5859 |
| 3 | 0.1004 | 0.2259 | 0.0768 | 0.2736 | 0.0417 |
| 4 | 0.0036 | 0.0019 | 0.0025 | 0.0033 | 0.0014 |
| 5 | 5.99 | 3.03 | 3.23 | 2.34 | 3.23 |

Figure 9:
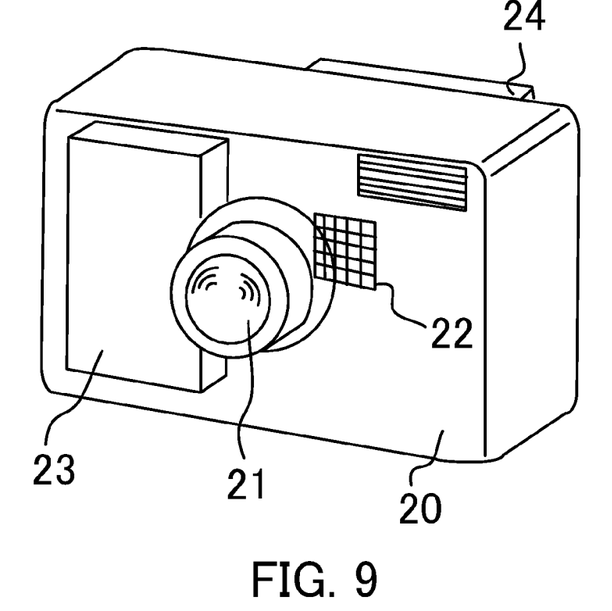
FIG. 9 is a schematic diagram of a principal part of an image pickup apparatus according to this embodiment.

Referring now to FIG. 9, a description will be given of an embodiment of the optical apparatus including an optical system according to this embodiment. FIG. 9 illustrates an embodiment of a digital still camera using the optical system of each embodiment for an image pickup optical system. In FIG. 9, reference numeral 20 denotes a camera body. Reference numeral 21 denotes an image pickup optical system including one of the optical systems of the first to fourth embodiments. Reference numeral 22 denotes a solid-state image pickup element (photoelectric conversion element), such as a CCD sensor and a CMOS sensor, provided in the camera body and configured to convert an object image formed by the image pickup optical system 21. Reference numeral 23 denotes a memory configured to record information corresponding to an object image photoelectrically converted by the solid-state image pickup element 22. Reference numeral 24 denotes a viewfinder made of a liquid crystal display panel and used to observe the object image formed by the solid-state image pickup element 22. Thus, the benefit of this embodiment can be effectively acquired by using the optical system of this embodiment for a variety of optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-144435, filed Jun. 25, 2010, which is hereby incorporated by reference herein in its entirety.

What is claimed is:

1. A radial gradient-index optical element having a refractive index that varies in a direction perpendicular to an optical axis, wherein the following conditional expressions are satisfied:

$|\theta dCgi(re)-(-0.1968\theta gdgi(re)+0.5480)|<0.02;$ $|\Delta\theta gdgi(r)|>0.025;$ $|\Delta\theta gd(re)-\Delta\theta gd(0)|>0.025;$ $|\theta gdgi(re)-\theta gdgi(0.1re)|<0.1;$ $\delta n\lambda(r)=n\lambda(r)-n\lambda(0);$ $\nu dgi(r)=\delta nd(r)/\{\delta nF(r)-\delta nC(r)\};$ $\theta gdgi(r)=\{\delta ng(r)-\delta nd(r)\}/\{\delta nF(r)-\delta nC(r)\};$ $\theta dCgi(r)=\{\delta nd(r)-\delta nC(r)\}/\{\delta nF(r)-\delta nC(r)\};$ $\Delta\theta gdgi(r)=\theta gdgi(r)-\{-1.687\times 10^{-7}\nu dgi(r)^3+5.702\times 10^{-5}\nu dgi(r)^2-6.603\times 10^{-3}\nu dgi(r)+1.462\};$ and $\Delta\theta gd(r)=\theta gd(r)-\{-1.687\times 10^{-7}\nu d(r)^3+5.702\times 10^{-5}\nu d(r)^2-6.603\times 10^{-3}\nu d(r)+1.462\},$ where r is a distance from the optical axis in the direction perpendicular to the optical axis, re is a maximum value of an effective beam diameter of a beam that transmits through the radial gradient-index optical element, nλ(r) is a refractive index of a medium of the radial gradient-index optical element at the distance r from the optical axis for one of g-line, F-line, d-line, and C-line, δnλ(r) is a refractive index difference of a medium between the optical axis and the distance r, νd(r) is an Abbe number of the medium at the distance r from the optical axis, θgd(r) is a partial dispersion ratio for the g-line and the d-line of the medium at the distance r, Δθgd(r) is a deviation of θgd(r) from a normal curve which is made by approximating a relationship between the Abbe number of a general glass and the partial dispersion ratio for the g-line and the d-line of the general glass, θgdgi(r) is an equivalent partial dispersion ratio for the g-line and the d-line of the radial gradient-index optical element at the distance r f, θdCgi(r) is an equivalent partial dispersion ratio for the d-line and the C-line of the radial gradient-index optical element at the distance r, Δθgdgi (r) is a deviation of θgdgi(r) from the normal curve which is made by approximating a relationship between the Abbe number of a general glass and the partial dispersion ratio for the g-line and the d-line of the general glass, νdgi(r) is an equivalent Abbe number of the radial gradient-index optical element at the distance r, the equivalent partial dispersion ratio is a partial dispersion ratio of virtual glass having a chromatic aberration equal to that of the radial gradient-index optical element, and the equivalent Abbe number is an Abbe number of the virtual glass.

2. The radial gradient-index optical element according to claim 1, wherein the following conditional expression is further satisfied:

$|\nu dgi(re)|<30.$

3. The radial gradient-index optical element according to claim 1, wherein the radial gradient-index optical element has a flat light incidence surface and a flat light exit surface.

4. An optical apparatus comprising a radial gradient-index optical element according to claim 1.

* * * * *